United States Patent Office 3,134,730
Patented May 26, 1964

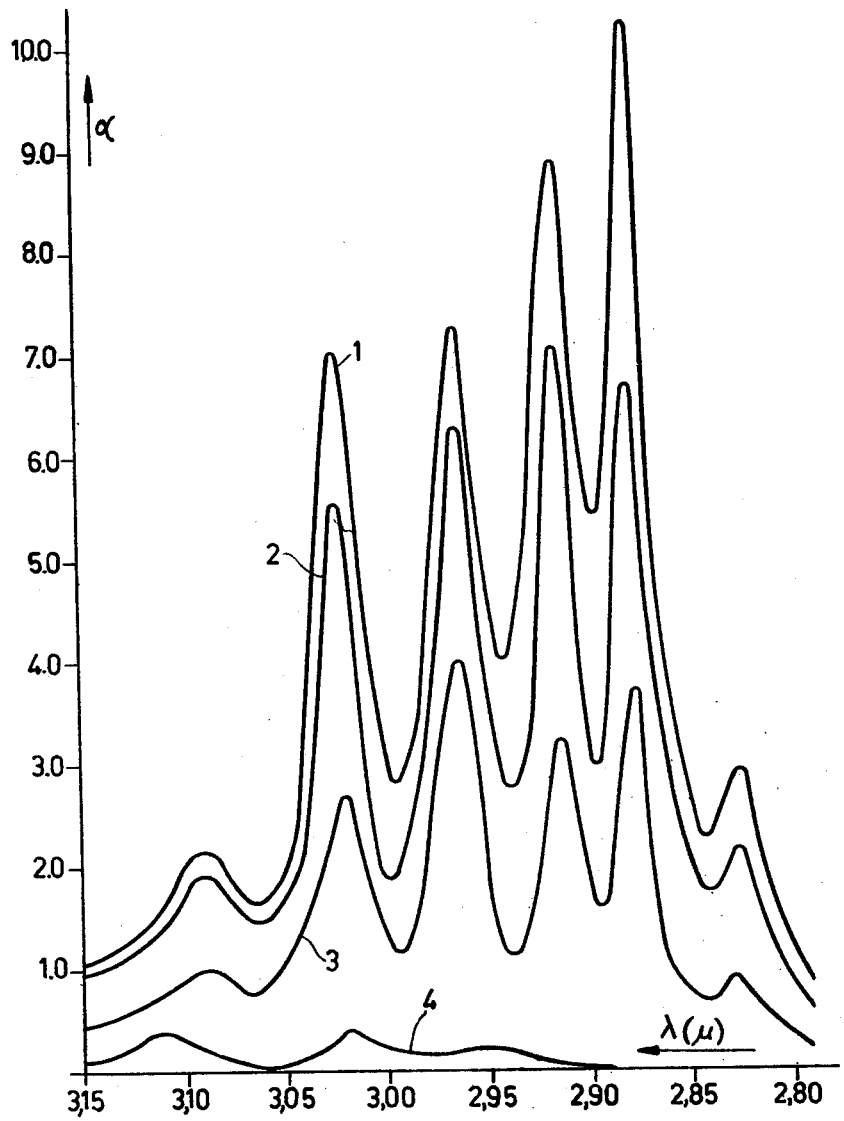

3,134,730
METHOD OF TREATING QUARTZ CRYSTALS FOR OPTICAL USES BY ELECTROLYTIC DEUTERATION
Ysbrand Haven and Adrian Kats, both of Emmasingel, Eindhoven, Netherlands, assignors to North American Philips Company, Inc., New York, N.Y., a corporation of Delaware
Filed July 24, 1961, Ser. No. 126,031
Claims priority, application Netherlands Sept. 15, 1960
5 Claims. (Cl. 204—130)

The invention relates to a method of treating articles consisting of crystalline quartz for optical uses.

In the infra-red in the wavelength range between 2.6 and 3.5µ, quartz shows absorptions, by which a loss of light occurs which may vary between 15 and 85% per mm. thickness, corresponding to an absorption coefficient α between 0.8 and 18.3. This absorption coefficient is defined by the formula:

$$\alpha = \frac{1}{d} \ln \frac{100-2R}{T}$$

in which $d$ is the thickness of the crystal in cm., $R$ the reflection and $T$ the transmission.

This absorption in the infra-red may be objectionable when using quartz for optical purposes. For example, prisms manufactured from such quartz crystals are unsuitable in spectroscopic apparatus for measurements in the near infra-red, because no sufficiently accurate and reliable measurements can be performed with them. The absorption also is undesirable, if the quartz is to be used as window material which is permeable to infra-red.

It has been established, that these annoying absorptions are caused by the presence of protons which are bound to oxygen ions in the crystal lattice and perform vibrations having a frequency spectrum which corresponds to the said wavelength range.

It is known that by replacing these protons in the quartz lattice by deuterons, the absorptions occurring between approximately 2.6 and 3.4µ are strongly reduced. As a result of the mass of the deuterons being two times larger, new absorptions occur at a wavelength range with approximately $\sqrt{2}$ times higher values, that is to say between approximately 3.5 and 4.6µ. However, this is no drawback at all because owing to the lattice vibrations occurring at wavelengths of approximately 3.7µ, quartz is not interesting for optical measurements in this wavelength range.

To replace the protons by deuterons, it is known to subject the articles consisting of crystalline quartz to an electrolysis process in a gaseous heavy water or to heat them for a prolonged period in a $D_2O$-containing atmosphere.

In order to obtain a complete exchange, these methods must be carried out at a rather high temperature, for example between 800 and 900° C. However, this is objectionable in connection with the inversion temperature of 573° C., at which quartz passes from the α-form into the β-form, as a result of which especially twinned crystals crack easily. Below this inversion temperature, however, no useful results can be obtained by means of the known methods, in as far as the exchange of hydrogen by deuterium is concerned.

According to the invention, the article, in contact with a pair of electrodes of which at least the cathode consists of deuterated material and between which an electric field of approximately 3000 v. per cm. thickness of the article is set up, is heated at a temperature between approximately 400 and 500° C. in an atmosphere which does not contain free or bound hydrogen.

In order to prevent the deuterons taken up in the article from being again replaced by hydrogen, it should be ensured that in the space in which the operation is carried out, hydrogen, either free or in a bound condition, is absent. It is therefore preferred to perform the operation in an atmosphere which consists of nitrogen which is saturated with gaseous heavy water. For the same reason, deuterated material is chosen as the anode.

This deuterated material may consist for example of platinum to which deuterium is absorbed. A particularly suitable material, however, is formed by deuterated carbon.

The deuteration of carbon products is known per se. For this purpose, a carbon product, which is obtained by incomplete combustion of hydrocarbon and which consequently still contains a rather high content of bound hydrogen is used as starting material. This carbon product is treated at elevated temperature with a gas which consists entirely or predominantly of deuterium and/or deuterium carbon compounds which are capable, under the reaction conditions, of yielding deuterium and exchanging it for hydrogen respectively.

The deuterated graphite lozenges which are used in the method according to the invention, are provided on two oppositely located planes of the quartz-crystal by means of a paste consisting of amorphous carbon with heavy water deuterated in the same manner.

It has also appeared that no effect is obtained according to this method when using quartz glass.

*Example*

Graphite powder obtained by incomplete oxidation of aromatic hydrocarbons is heated at a temperature of 650° C. in a closed glass tube which is also filled with pure deuterium. Lozenges are compressed from this powder and are provided, by means of a paste consisting of amorphous carbon with heavy water deuterated in the same manner, on two oppositely located planes of a quartz crystal 1.4 mm. thick.

At the graphited electrodes, the crystal is provided with connection wires and then placed in a furnace which is dried beforehand by passing through hydrogen-free nitrogen which is saturated with vapour of heavy water. The furnace is heated at a temperature of 500° C. and then a direct voltage of 3000 v. per cm. thickness of the crystal is set up between the graphite electrodes. The result is shown in the accompanying graphical representation. It shows the variation of the absorption coefficient ($\alpha$) per cm. thickness of the crystal as a function of the wavelength ($\lambda$) in the range of from 2.8 to 3.15µ. The measurements are carried out at the temperature of liquid nitrogen (78° K.), since at such a low temperature the absorption spectrum is represented with a finer structure than at room temperature.

Curve 1 shows the absorption spectrum of the crystal before the treatment. Curve 2 shows the spectrum after the electric field has been present for 2 hours; curve 3 shows the spectrum after 12 hours' exposure to the electric field, and curve 4 shows the spectrum after the hydrogen has been exchanged completely for deuterium. The remaining spectrum which is shown by curve 4 is to be ascribed to $SiO_2$-vibrations and can consequently not be reduced by continued deuteration.

What is claimed is:

1. A method of reducing spectral absorptions in quartz in the range of about 2.6 to 3.4µ comprising the steps, placing the quartz between electrodes one of which is a cathode electrode and consists of a deuterated material, applying a voltage of about 3000 v./cm. of thickness between the electrodes, and heating the quartz to a temperature approximately between 400° C. and 570° C. in an atmosphere substantially free of unbound and bound hydrogen.

2. A method of reducing spectral absorptions in quartz as defined in claim 1 in which the other electrode is an anode which also consists of deuterated material.

3. A method of reducing spectral absorptions in quartz as defined in claim 2 in which the atmosphere is nitrogen saturated with gaseous heavy water.

4. A method of reducing spectral absorptions in quartz as defined in claim 3 in which the electrodes consist of platinum to which deuterium is absorbed.

5. A method of reducing spectral absorptions in quartz as defined in claim 3 in which the electrodes consist of deuterated carbon.

References Cited in the file of this patent

UNITED STATES PATENTS 2,897,126     George  ---------------- July 28, 1959

OTHER REFERENCES

Naturwissenschaften, volume 47, No. 12, page 275, June 1960.